Patented Nov. 9, 1926.

1,606,618

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

ENAMEL REMOVER.

No Drawing.   Application filed February 24, 1922.   Serial No. 539,029.

This invention relates to a removing composition adapted for softening enamel coatings so that they may be readily detached from the metal surfaces on which they form a protective coating. The so-called enamel finishes used for coating bicycle frames, automobile bodies and various other metallic surfaces are not readily softened by the standard compositions used for removing coatings of ordinary paint and varnish, many of such removing compositions consisting essentially or largely of benzol, alcohol and wax. In the present invention it is an object to produce a composition which will attack and soften enamel coatings more effectively than the standard remover aforesaid.

When caustic soda is dissolved in ethyl alcohol as for example ordinary denatured alcohol to form a saturated solution and the latter is spread out in a thin layer I have noted the formation of a film over the surface which retards evaporation of the alcohol and which renders the layer less easily ignited on bringing a flame into the vicinity of the coating. If benzol which is not a solvent for caustic soda is added to the concentrated alcoholic solution, the caustic alkali is not precipitated as would be expected but remains in solution or in a state of quasi solution and the mixture of alcohol and benzol functions quite effectively as a removing composition. The mixture of the two solvents affords the valuable solvent effect resulting from a composite of this character containing penetrating and loosening solvents. Although no wax is present to form a film as is the case in the standard remover referred to above, the caustic soda acts as a film-forming agent retarding the evaporation effectively and reducing tendency of the composition to ignite when a flame is brought into the neighborhood of the exposed product.

It is a rather remarkable fact that the addition of say an equal volume of benzol to a practically saturated solution of caustic soda in denatured alcohol does not precipitate most of the caustic soda. When a non-solvent is added to most alcoholic saline solutions the salt is very easily thrown out through the change in solubility due to the addition of the non-solvent for the salt. This is very marked in such cases for example as potassium iodide or sulpho cyanide, sodium bromide and the like from whose alcoholic solutions benzol throws down the salt very promptly as a crystalline product having practically no evaporation retarding quality.

The film-forming quality of the present removing composition may be in part attributed to the absorption by the exposed surface of carbon dioxide from the air, the resulting sodium carbonate being quite insoluble in the mixture serving in some way especially in the presence of the uncarbonated alkali in forming the film or pellicle. Instead of being of a crystalline character the film appears quite closely to resemble that produced by wax.

Some criticism has been raised against the use of wax in certain cases one being that it is not always possible without some effort to completely remove the wax from the surface and that subsequent coats of paint or varnish if contaminated by wax do not dry quite as rapidly. Whether or not this is a proper criticism of the waxy remover it remains true that the composition of the present invention constitutes a true film-forming removing composition free from wax. Thus painted surfaces treated with the remover may be washed off with water instead of with gasoline or other hydrocarbon as is now frequently employed. This procedure is especially applicable when removing enamel from metal surfaces.

A suitable composition may be made by dissolving caustic soda in denatured alcohol to approximately the saturation point or until about 120 to 150 grams are dissolved in a liter of the alcohol. Approximately an equal volume of benzol then may be added.

The film which forms in the present instance is not so readily affected by heat as is that produced by wax. The latter is quite sensitive to an increase in temperature and the wax becomes very soluble in the composition when a temperature of 30 or 40° C. is reached. In the present case I have heated up the composition to boiling and noted that on removing from the flame a film was present over the surface. Thus the composition may be employed during hot summer days or in places exposed to considerable heat without the same effect being produced on the film by the heat as would result in the case of the wax film.

The proportion of alcohol to benzol may be varied more or less and I note that even when more than an equal volume of benzol is added to the alkali solution the caustic soda is not thrown down but remains in a state of super-saturation or as a quasi solution or in some form which quite readily forms a film on exposure.

The strength of the caustic alkali may be varied somewhat although I prefer to use fairly strong solutions especially when treating enamel surfaces as the higher percentage of caustic seems to give better results as a rule than the lower proportions. While I may use caustic potash I prefer caustic soda.

The alcohol employed is preferably free from esters which would absorb and neutralize a portion of the caustic alkali. Different alcohols have different properties with respect to caustic alkali and miscibility of the alkaline solution with benzol. Wood or methyl alcohol for example when saturated with caustic soda does not mix readily with benzol. Acetone has very low solvent powers for caustic soda.

However it should be understood that I do not wish to be limited to the precise composition offered by the way of illustration but intend to include herein compositions of a substantially alkaline character the liquid or solvent portion of which is preferably a composite nature and which even though wax be not present readily forms an evaporation retarding film on exposure. Hence I may add such solvents as acetone or other ketones in greater or less quantity, various other alcohols in which caustic alkali is soluble without chemical action on the alcohol, and other hydrocarbons such as toluol, xylol and the like provided the use of such materials or the amount added does not destroy the relationship between the solvents and the film-forming agent.

Thickening agents such as soaps, wax and the like may also be added and ceresin wax for example may be introduced to produce a smooth creamy or buttery composition which spreads well under the brush and is of such consistency that it may be readily applied to vertical surfaces. This composition may be used for example for removing the enamel from automobile bodies, fenders and the like.

A composition is made by dissolving 150 grams of caustic soda in alcohol to form a liter of the solution, adding a like volume of benzol and incorporating 175 grams of ceresin wax. The latter may be introduced in solution in the benzol or may be added after the other ingredients have been admixed. A preferable way is to dissolve the wax in the benzol by heating and while still warm add the alcoholic solution gradually with stirring.

From the film-forming standpoint and hence rate of evaporation of the composition the proportion of caustic soda is of consequence. If enough of the latter is present so that there is always a precipitate in the solution the tendency to film formation of satisfactory quality is considerably enhanced. Furthermore caustic soda in higher concentrations than those mentioned gives a certain body or viscosity to the solution.

In one case a liter of denatured alcohol was shaken with 300 grams of caustic soda forming a saturated solution and a soft pasty deposit. On addition of a liter of benzol the viscosity of the composition appeared to increase somewhat but the insoluble material was not present in the form of a heavy mass as would be expected when precipitating caustic soda a substance of high specific gravity from liquids of the low specific gravity of benzol and alcohol. I term this condition "substantially homogeneous" to distinguish from a liquid containing a coarse, heavy, readily settling precipitate. Instead of being of great density and settling rapidly the precipitate remained in suspension for some time and on agitating was quickly distributed through the liquid. Such a composition has very pronounced film-forming properties. Even without exposure to air and carbon dioxide a film is readily produced. For example I have shaken the composition thoroughly in a bottle until all the carbon dioxide was absorbed. On allowing the bottle to stand for a short time tightly stoppered, a film formed even though carbon dioxide was absent. Such compositions highly concentrated in caustic soda may therefore be used when the conditions so demand.

On the other hand the amount of caustic alkali may be reduced by adding acetone which is a far more powerful precipitant for caustic soda than is benzol. If acetone is added sufficient to create a substantial deposit of precipitated caustic material the film-forming tendencies are increased. In like manner benzol may be entirely omitted and its place taken by for example one-half its amount of acetone in such caustic compositions. Such a remover free from hydrocarbons may be used in removing certain coatings where the alcohol, acetone mixture has a greater solvent effect.

While I have specifically set forth the use of caustic alkali as inorganic film-forming agent capable of retarding the evaporation of the solvent material of the removing compositions herein it is understood that I do not limit myself thereto.

I call attention to the fact that this composition, while not necessarily anhydrous, does not contain any large precentage of water. Ordinary denatured alcohol, which is the preferred solvent for the caustic soda, will usually be found to contain around 5% or so of water, and if denatured alcohol of this strength is used with about an equal amount of benzol, the water in the product would amount to about 2.5%. Other alcohols likewise can conveniently be of about 94 or 95%.

What I claim is:—

1. A substantially homogeneous removing composition adapted for removing enamel finish comprising alcohol, benzol and sufficient caustic soda to produce an evaporation retarding film on exposure, such materials being in such proportions as to produce a substantially homogeneous composition.

2. A substantially homogeneous removing composition adapted for removing enamel finish comprising wax, benzol, denatured alcohol and caustic soda in film-forming amounts, such materials being in such proportions as to produce a substantially homogeneous composition.

3. An enamel remover comprising approximately equal parts of benzol and a saturated solution of caustic soda in denatured alcohol.

4. An enamel remover comprising approximately equal parts of benzol and a saturated solution of caustic soda in denatured alcohol incorporated with a ceresin wax thickener.

5. A substantially homogeneous removing composition adapted for removing enamel finish comprising an alcoholic solvent, a miscible hydrocarbon and an inorganic film-forming agent capable of retarding the evaporation of the solvent material, such materials being in such proportions as to produce a substantially homogeneous composition.

6. A composition for removing enamel from metallic surfaces comprising an alcoholic solution of caustic alkali, of not substantially below 12% strength, and about an equal volume of benzol.

7. A composition suitable for removing enamel comprising a concentrated solution of caustic alkali in alcohol, such solution being not substantially below 15% strength and a somewhat volatile aromatic hydrocarbon liquid containing from about 6 to 8 carbon atoms, such two liquids being miscible with each other.

CARLETON ELLIS.